United States Patent
Forster

(10) Patent No.: US 12,265,874 B2
(45) Date of Patent: Apr. 1, 2025

(54) RFID DEVICES INCLUDING EMBOSSED OR OTHER ELEMENTS

(71) Applicant: Avery Dennison Retail Information Services, LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/105,930

(22) Filed: Nov. 27, 2020

(65) Prior Publication Data

US 2021/0158125 A1    May 27, 2021

Related U.S. Application Data

(60) Provisional application No. 62/940,308, filed on Nov. 26, 2019.

(51) Int. Cl.
*G06K 19/077* (2006.01)

(52) U.S. Cl.
CPC .............................. *G06K 19/07773* (2013.01)

(58) Field of Classification Search
CPC ..................... G06K 19/07773; G06K 19/0723
See application file for complete search history.

(56) References Cited

U.S. PATENT DOCUMENTS

| | | | |
|---|---|---|---|
| 7,607,583 B2 | 10/2009 | Berardi et al. | |
| 7,791,489 B2 | 9/2010 | Gelbman et al. | |
| 7,855,648 B2 | 12/2010 | Vigneron et al. | |
| 8,033,476 B2 | 10/2011 | Jones | |
| 8,052,171 B2 * | 11/2011 | Staub | G06K 19/073 340/572.1 |
| 8,936,197 B2 | 1/2015 | Tiedmann et al. | |
| 9,251,456 B2 * | 2/2016 | Omura | G06K 19/08 |
| 2003/0067389 A1 * | 4/2003 | Look | G06K 19/16 340/572.1 |
| 2004/0118930 A1 * | 6/2004 | Berardi | G06Q 20/00 235/492 |
| 2004/0218273 A1 * | 11/2004 | Mimura | G02B 5/124 359/530 |
| 2005/0046573 A1 * | 3/2005 | Velasco | G06K 19/07 340/572.8 |
| 2005/0242325 A1 * | 11/2005 | Mather | C09K 19/2007 252/299.01 |
| 2009/0308935 A1 * | 12/2009 | Sziljer | G07D 7/01 29/601 |
| 2015/0186689 A1 * | 7/2015 | Hess | G06K 19/07381 340/10.1 |
| 2019/0034773 A1 * | 1/2019 | Vosoogh-Grayli | G06K 19/06037 |

FOREIGN PATENT DOCUMENTS

| | | | |
|---|---|---|---|
| CN | 204965911 U | 1/2016 | |
| WO | WO-2018024342 A1 * | 2/2018 | A61B 34/10 |

* cited by examiner

*Primary Examiner* — Sonji N Johnson

(57) ABSTRACT

In some embodiments, an RFID device includes an RFID assembly that includes an RFID antenna and an RFID chip electrically coupled to the RFID antenna, the RFID assembly having a first side and a second side. The RFID device may further include a first layer including a visual element and having a first side and a second side, the first side of the first layer contacting a first side of the RFID assembly. The RFID device may further include a second layer having a first side and a second side, the first side of the second layer contacting at least one of the first visual element and the RFID assembly.

17 Claims, 4 Drawing Sheets

RFID DEVICES INCLUDING EMBOSSED OR OTHER ELEMENTS

CROSS-REFERENCE TO RELATED APPLICATION

The present application claims the benefit of U.S. Provisional Patent Application No. 62/940,308 filed Nov. 26, 2019, which is incorporated herein by reference in its entirety.

BACKGROUND

Radio Frequency Identification ("RFID") devices are increasingly used to track and identify goods and to provide access control to individuals among numerous other uses. RFID devices can be produced at low cost and are small and flexible. RFID devices, such as RFID tags, include an antenna that is coupled to an RFID chip. Passive RFID devices typically receive power from nearby radiofrequency wave sources, such as RFID readers or RFID printers that are transmitting radiofrequency energy at the resonant frequency of the RFID device. When interrogated by an RFID reader, the RFID device receives power from the RFID reader and transmits a coded return signal. The RFID reader can also program RFID devices in a similar fashion. Active RFID devices may have their own power sources.

Some conventional RFID systems may be difficult to identify or locate under some circumstances, which may decrease their utility. Accordingly, improvements may be made over conventional RFID systems with respect to visibility or functionality for such RFID systems.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

In some embodiments, an RFID device includes an RFID assembly that includes an RFID antenna and an RFID chip electrically coupled to the RFID antenna, the RFID assembly having a first side and a second side. The RFID device may further include a first layer including a first visual element and having a first side and a second side, the first side of the first layer contacting a first side of the RFID assembly. The RFID device may further include a second layer having a first side and a second side, the first side of the second layer contacting at least one of the first visual element and the RFID assembly.

The first layer may include plastic. The plastic may include one or more of polyethylene terephthalate ("PET"), polyethylene, polypropylene, polycarbonate, polystyrene, and acrylonitrile butadiene styrene ("ABS").

The second layer may include a second visual element, and the first side of the second layer may contact the second side of the RFID assembly. The second layer may include a fibrous substrate. The fibrous substrate may include paper.

The first or second visual element may include one or more of patterns, symbols, text, and machine-readable indicia. The first or second visual element may include one or more of diffraction patterns, holograms, and retroreflective elements. The first or second visual element may include machine-readable indicia that are retroreflective to infrared light.

The RFID antenna may be formed from a foil layer. The foil layer may be embossed. The foil layer may be retroreflective. The foil layer may be retroreflective to millimeter wave radio frequencies and the embossed optical element may be retroreflective to infrared light. The RFID device may include a modifying element electrically coupled to the RFID chip, wherein the modifying element includes at least one of a heating element and a piezoelectric element. The embossed optical element may be configured to be modified by the modifying element based on receipt of a signal. The modification of the embossed optical element may be reversible.

An embossing device may include an embossing structure having a surface comprising an inverted set of indicia, and a gap configured to reduce damage to an RFID chip during embossing. The embossing structure may include a patterned roller.

A method of manufacturing an RFID device may include providing an RFID assembly, the RFID assembly comprising an RFID antenna and an RFID chip electrically coupled to the RFID antenna, affixing an optical element over at least a portion of the RFID assembly, and embossing at least a portion of the optical element. At least one of providing the RFID assembly, affixing the optical element, and embossing may be performed using a roll-to-roll process.

DETAILED DESCRIPTION

The systems and methods disclosed herein are described in detail by way of examples and with reference to FIGS. 1A to 6B. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

As can be appreciated, RFID devices are useful for a variety of applications due to their low cost, small size, and their ability to be remotely powered by an RFID reader or interrogator. For example, RFID devices can be useful for item identification and authenticity checking, item tracking, inventory, and access control depending upon the design of the RFID device.

The present disclosure generally describes improved RFID devices including embossed and/or other elements. For example, in some embodiments, embossed optical elements can display indicia to enhance use and identification of the RFID tag and can be included in a variety of configurations such as a film overlying the entire RFID device or as an optical element overlying only portions of the RFID device.

Embossed optical or radiofrequency elements generally refer to optically or radiofrequency transparent or reflective layers or substrates which have been embossed to display patterns, symbols, text, or other indicia or to enhance optical or radiofrequency signal reflection. For example, elements, radiofrequency elements, or embossed optical elements can be formed of a suitable plastic, such as polyethylene terephthalate ("PET"), in various embodiments. As can be appreciated, other materials can also be suitable including polyethylene, polypropylene, polycarbonate, polystyrene, acrylonitrile butadiene styrene ("ABS") and glass depending on the design criteria and cost of the RFID device. Additional possible types of layers or substrates may include metal, paper, cardboard, wood, semiconductors, paint, laminates, adhesives, or other materials. Optically transparent as used herein means that at least some portion of light is transmittable through the material and includes substantially clear, substantially hazy, and substantially light blocking materials. In certain embodiments, the optically transparent substrates can be colorless or, in other certain embodiments, can be colored either uniformly or non-uniformly (e.g., in a pattern, randomly, etc.). In certain embodiments, embossed optical elements can alternatively reflect light and/or radiofrequency waves.

Figure 1A:
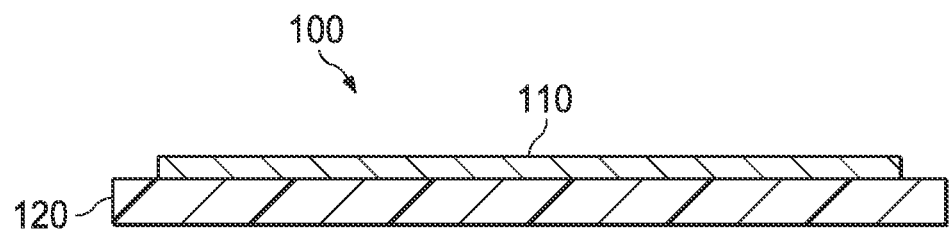
FIG. 1A depicts a cross-sectional view of an example RFID tag including a first layer and a second layer in accordance with some embodiments.
Figure 1B:
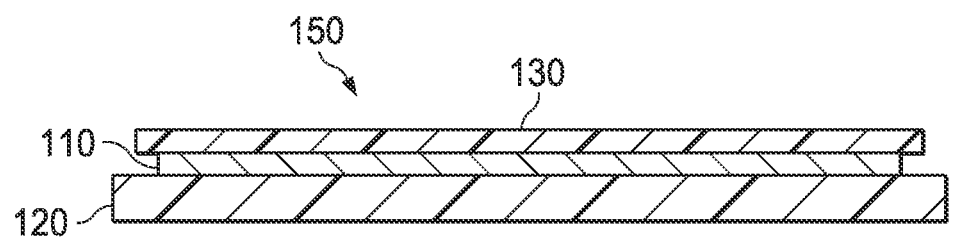
FIG. 1B depicts a cross-sectional view of an example RFID tag including a first layer, a second layer, and a third layer, in accordance with some embodiments.
Figure 1C:
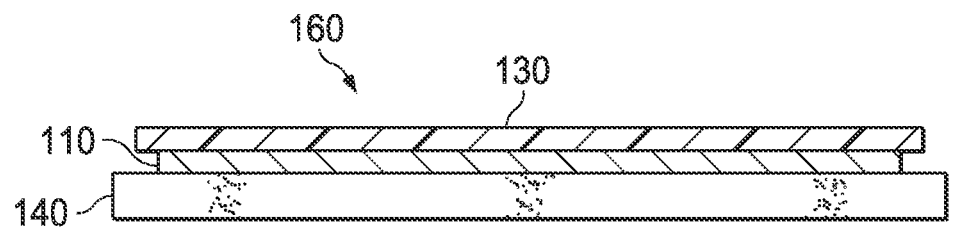
FIG. 1C depicts a cross-sectional view of an example RFID tag including a substrate, a first layer, and a second layer, in accordance with some embodiments.

In some embodiments, FIGS. 1A to 1C may represent example RFID devices 100, 150, and 160 including embossed optical elements overlying the entire RFID device. FIG. 1A includes a first layer 110 having a first side and a second side and a second layer 120 having a first side and a second side. FIG. 1B includes a first layer 110, a second layer 120, and a third layer 130, the third layer having a first side and a second side. FIG. 1C includes a first layer 110, a third layer 130, and a fourth layer 140, the fourth layer having a first side and a second side.

In some embodiments, an additional protective layer of material such as plastic, paper, or cloth, covers one or more sides of the RFID device 100, 150, 160. Such protective layers may be at least partially or completely optically translucent or reflective, radiofrequency translucent or reflective, composed of a sheet of material, may have holes or openings, or may be composed of mesh.

In various embodiments that include one or more embossed layers, the embossed areas of the materials may be adjacent to a non-embossed area that includes at least an RFID chip and RFID antenna. By including areas where embossing occurs around but not on top of an RFID chip and antenna, the RFID device 100, 150, 160 in some embodiments may be capable of being formed by a roller or press that includes a hole or indentation that protects the RFID device from pressure while retaining embossing capability for other areas. Accordingly, the RFID device 100, 150, 160 may be on a non-embossed area but be adjacent on 1, 2, 3, or 4 sides to embossed material. In other embodiments, one or more of the embossed layers may be embossed prior to being combined with the other structures forming the RFID device 100, 150, or 160.

In some embodiments, FIG. 1A includes an RFID device 100. In various embodiments, the first layer 110 includes an RFID assembly, and a second layer 120 includes an embossed optical layer. The RFID assembly may include all of the conventional components of an RFID tag including an RFID chip (not shown) and one or more antennas, such as foil antennas (not shown). In certain embodiments, the RFID assembly can be formed solely of the RFID antenna and an RFID chip attached to the antenna (e.g., a foil antenna). In such embodiments, the RFID tag 100 can be supported by the second layer 120, which may be or be composed of an embossed optical element. The embossed optical element can be formed of a suitable material such as PET and can display embossed indicia. The RFID device 100 of FIG. 1A can be substantially transparent because all of the elements except for the foil antenna and RFID chip can be optically transparent.

In some embodiments, the second layer 120 comprises a radiofrequency wave reflective structure. For example, the second layer 120 may comprise a metal layer, a radiofrequency retroreflective material, a prismatic radiofrequency reflective material, a plurality of parabolic reflectors, and/or other radiofrequency wave reflective structures. Such structures may aid in dispersion or targeting of signals that emanate from the RFID tag 100. Dispersion may help with allowing a moving RFID reader to receive signals from the RFID tag across a wider area. Focusing of the signals from the RFID tag 100, such as at a target position on a road where a vehicle can receive the signals, may assist with sending RFID tag return signals to a vehicle. Alternatively, focusing of the reflected signals from the RFID tag 100 mounted within a vehicle may assist with directing return signals to roadside or overhead mounted RFID reader components.

FIGS. 1B and 1C may depict alternative embodiments of an RFID tag. In some embodiments, in FIG. 1B, an RFID device 150 may include a first layer 110 that includes an RFID assembly and two embossed optical and/or radiofrequency elements (e.g., second layer 120, third layer 130) on opposing sides of the RFID assembly. The embossed optical and/or radiofrequency elements can be of the same, or different, size and can display identical, or differing, embossed indicia. By sandwiching the RFID assembly between two embossed optical and/or radiofrequency elements, the RFID structure 150 may gain enhanced visibility or other capabilities for such purposes as making an RFID tag, device, card, clothing label, fabric section, page, street sign, marketing sign, store sign, clothing article, sticker, tape, film, ID card, license plate, vehicle identifier, or other item easier to locate or receive information from, such as by a person or a machine. A benefit of such devices may be to provide more information in a compact area. Other advantages may include greater efficiency and reduced waste given that the RFID device and optical elements may be combined in a single RFID device 150. Additional advantages may include improved communication with vehicle navigation systems and/or augmented reality systems, which may gain additional information regarding on-road and near-road signs, vehicles, objects, or people through a combination of visual elements and/or RFID signals.

In various embodiments, one or both of second layers 120 and third layer 130 may comprise radiofrequency wave reflective material. For example, one or both of second layer 120 and third layer 130 may be composed of or coated by radiofrequency wave reflective material, and one or both of the second layer 120 and the third layer 130 may include an opening, a radiofrequency wave transparent section, or another type of portion that allows direct communication with the one or more antennas of the RFID assembly of the first layer 110. In some embodiments, if one of second layer 120 and third layer 130 includes an opening allowing direct communication with an RFID antenna of RFID substrate from the corresponding side, then the other of the second layer 120 and third layer 130 may cover one or more of the RFID antennas of the first layer 110 on the opposite side of the first layer 110 with a radiofrequency wave reflective layer that helps reflect signals from the RFID antenna towards the opening that may exist in one of the second layer or the third layer.

In some embodiments, FIG. 1C may depict an RFID device 160 including a first layer 110 having an RFID assembly, a third layer 130 having an embossed optical element, and a fourth layer 140 comprising a fibrous support substrate. The fibrous support substrate can be formed of any fibrous-like materials such as paper, cardboard, cloth, fabric, etc. As can be appreciated, the combination of the RFID assembly of the first layer 110 and the fibrous support substrate of the fourth layer 140 encompasses most conventional RFID tags having an RFID antenna and RFID chip affixed to a paper substrate.

As can be appreciated, any of the RFID devices depicted in FIGS. 1A to 1C can be adapted to other designs. For example, a larger ticket or tag can incorporate the RFID device of FIGS. 1A to 1C within the structure or the larger item such as within a window. In various such embodiments, the embossed optical element(s) can be located solely over the RFID device portion or can extend across the entire face(s) of the larger item. In certain embodiments, an RFID device (e.g., an RFID tag) can alternatively be embedded in an existing optical element. For example, an RFID device, such as the RFID device 100 depicted in FIG. 1A, can be embedded in a plastic container, such as a plastic storage bottle for skincare.

As can be appreciated, the embossed optical element can provide new functionality to the RFID devices described herein. For example, in certain embodiments, a light, such as the LED light found on a cellphone, can be directed through the embossed optical element to provide a projection of the indicia contained on the embossed optical element. In addition to providing enhanced counterfeiting security, such features can enhance the attractiveness and novelty of the RFID tag for tickets and other memorabilia.

Embossing of the optical and/or radiofrequency element can be performed by use of patterned rollers with the optional application of heat. In such embodiments, patterned rollers can be pressed onto the surface of an optical element of an RFID tag to emboss, and form indicia on, the surface of an optical and/or radiofrequency element. As can be appreciated, the use of patterned rollers is particularly amenable to roll-to-roll processing but can also be used for processing of batches or individual RFID tags. In alternative embodiments, a die press or stamp can alternatively be used to process batches, or individual, RFID tags. In some embodiments, an additional metal layer is added to the patterned element, such as by using magnetron sputtering, chemical vapor deposition, thermal evaporation electron beam evaporation, or ion beam processing.

Figure 2A:
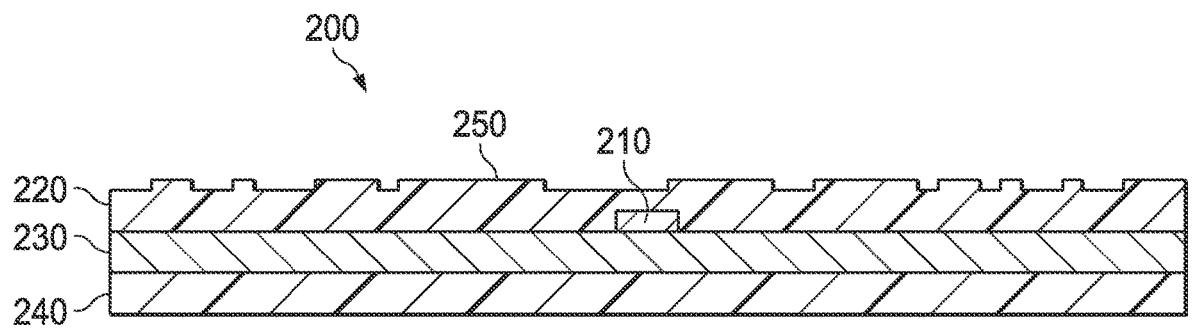
FIG. 2A depicts a cross-sectional view of an example RFID tag to illustrate the embossing of an optical element, in accordance with some embodiments.
Figure 2B:
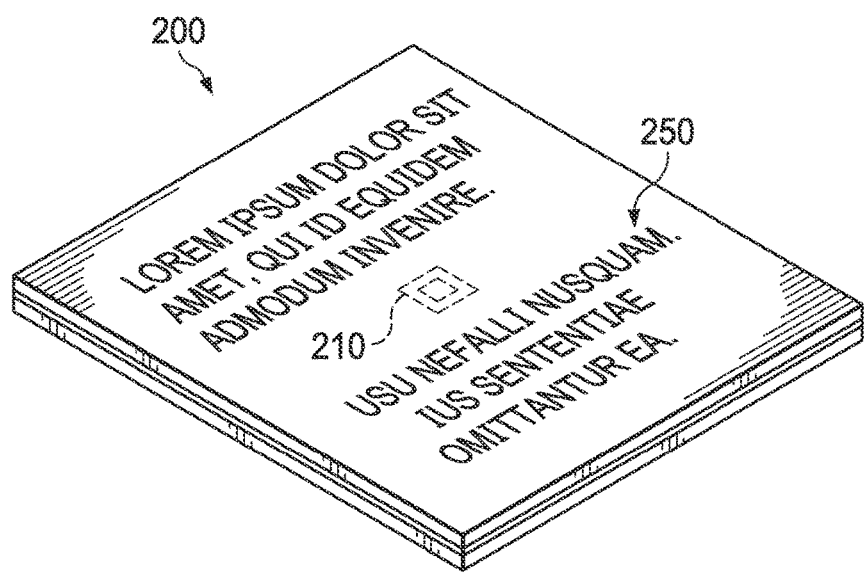
FIG. 2B depicts a perspective view of FIG. 2A, in accordance with some embodiments.

FIG. 2A depicts a cross-sectional view illustrating the results of an embossing process. As depicted in FIG. 2A, an RFID device 200 includes a first layer 240 that may include a substrate (e.g., paper, a backing substrate, adhesive), a second layer 230 including an RFID assembly, and a fourth layer 220 that includes an embossed optical and/or radiofrequency wave element having embossed indicia 250 formed on the outer surface. An RFID chip is part of the RFID assembly and is attached to a foil antenna of the RFID assembly. The embossing tool (e.g., patterned roller) can include a gap or opening of suitable size to protect the RFID chip from damage during the embossing process, and the gap or opening may be the same size as the protective cavity 210 shown in FIG. 2A. As can be appreciated, the gap can be physically larger than the RFID chip and/or antenna depending on the tolerances and accuracy of the embossing process. FIG. 2B depicts a perspective view of the RFID tag 200 illustrating the size of the protective cavity 210, which may be the same or similar in size to the gap. As can be appreciated, the embossed indicia 250 is illustrated as being text but symbols, patterns, etc., are alternatively contemplated.

In some embodiments, the protective cavity 210 is formed before assembly of the fourth layer 240 and the second layer 230. For example, the protective cavity 210 may be formed by cutting out a portion of the fourth layer 240, controlling formation of the fourth layer 240, or by embossing the fourth layer 240 such that one or more cavities, protrusions, and/or indentations are formed on one or both sides of the fourth layer 240. In some embodiments, the protective cavity 210 is formed as a result of forming an opening in the second layer 230 or the first layer 240. In other embodiments, the protective cavity 210 is formed by adding an additional layer having a hole cut through it over the second layer 230.

In some embodiments, the embossed optical element can be embossed and patterned before application to an RFID tag. In some of these embodiments, no gap in the embossing instrument is used. The embossed optical and/or radiofrequency wave element can generally be attached to a surface of an RFID tag using one or more of adhesive, heat, ultrasonic welding, etc.

As can be appreciated, embossing of the optical elements described herein is not limited to mechanical rollers, presses, or stamps. For example, suitable embossed optical elements can alternatively be formed using an etching process such as laser ablation or acid etching of the optical substrate. In yet other embodiments, embossed optical elements can alternatively be formed through a deposition process that builds up the embossed pattern (e.g., via 3D printing or printing of a suitable ink). As used herein, the embossed optical and/or radiofrequency wave element can also mean a debossed optical and/or radiofrequency element. In some embodiments, if alternative processes are employed, they should be controlled to avoid damage to the RFID assembly comprising the RFID antenna and RFID chip.

Figure 3:
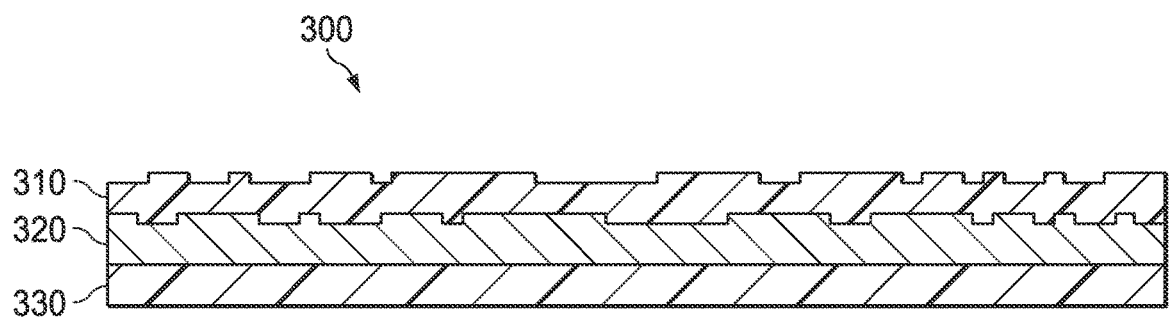
FIG. 3 depicts a cross-sectional view of an RFID tag including a combination of embossed optical and foil layers, in accordance with some embodiments.
Figure 4:
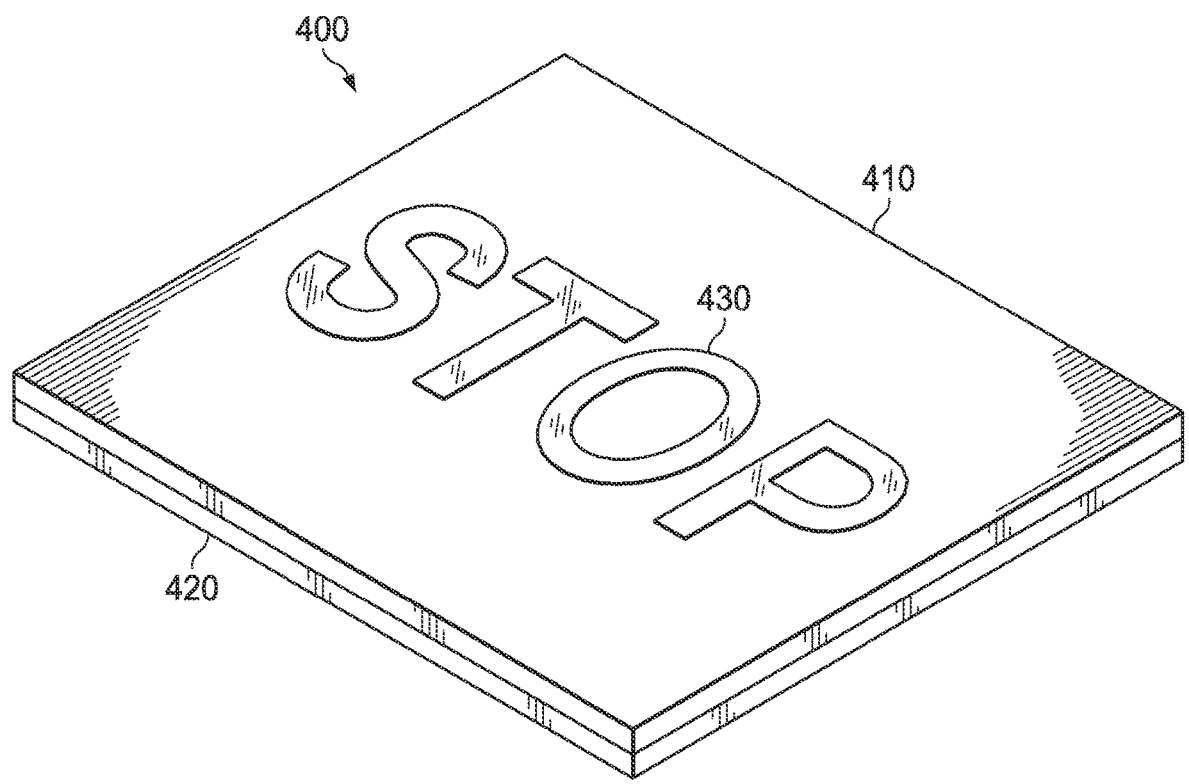
FIG. 4 depicts a perspective view of an RFID tag including an embossed optical retroreflector element, in accordance with some embodiments.

In certain embodiments, the RFID assembly can be formed from a foil layer. In such embodiments, the foil layer can itself be embossed to enhance the optical and/or radiofrequency wave properties of an RFID tag. For example, as depicted in FIG. 3, such RFID tags 300 can include a backing substrate 330 (e.g., paper), a foil layer 320 that creates a foil RFID antenna (not shown), and/or one or more embossed optical and/or radiofrequency elements 310 (e.g., one or more layers 310). In various embodiments, the foil layer 320 is embossed to create a first set of embossed indicia and the embossed optical element 310 is embossed either before or after it is attached to the foil layer 320 to create a second set of embossed indicia. The first and set sets of embossed indicia can interact to create interacting optical properties such as indicia that look different depending upon one or more of a viewer's angle of viewing, lighting angles, number of light sources, types of lighting, the colors of the light sources, and optical properties of the foil layer 320 and the embossed optical element 310.

In some embodiments, the foil layer 320 can be embossed with a retroreflective pattern. Although the retroreflective pattern may be light sensitive, the retroreflective pattern can alternatively, or additionally, be designed to be retroreflective to radio frequencies such as extremely high-frequency ("EHF") and terahertz radio frequencies including the millimeter wave frequencies (e.g., frequencies having about 1 mm to about 10 mm waves). As can be appreciated, such frequencies are useful for millimeter wave transmissions and provide a redundant mechanism to track, identify, and/or measure distances to such RFID tags.

In certain embodiments, it can also be useful for the foil layer of an RFID tag to act as a reflective metallic surface (e.g., to act as a hologram or mirror). In such embodiments, the RFID antenna can be formed on the foil layer (using, e.g., a laser) while substantially leaving the remaining surface of the foil layer intact.

The embossed features of the RFID devices disclosed herein can vary widely. For example, the embossed features can vary from relatively simple indicia (e.g., simple patterns, text, or symbols) to more complex indicia. More complex indicia can include one or more of diffraction patterns, double slit patterns, holographic patterns, and retroreflector patterns.

As can be appreciated, the indicia created by the inclusion of embossed optical elements can provide a number of advantages and/or benefits. For example, in certain embodiments, the indicia can present an attractive design to an RFID device or tag that is eye-catching and unique. In addition or alternatively, the indicia may make the RFID device or tag more noticeable in lower light conditions such as within a dark room, on the road at night, or when visibility is reduced such as during rain, snow, or fog. By being more noticeable through reflecting light, the RFID device or tag may make viewers more aware of the RFID device's presence. For retroreflective embodiments, additional reflections back towards the source of visible light, infrared light, millimeter wave, or other radiofrequency signals may improve detection of the RFID device, detection of an object (such as a sign) incorporating the RFID device, communication with the RFID device, and/or other benefits.

Additionally, or alternatively, the indicia can provide increased security by providing an element that is difficult to counterfeit. For example, an access control card or ticket can include indicia that identifies the card or ticket as legitimate while also providing an attractive design that adds value and authenticity to the end user. In certain embodiments, the indicia can include machine-readable indicia such as a two-dimensional (e.g., QR code) or three-dimensional barcode (e.g., a holographic barcode).

In certain embodiments, the embossed optical element can increase the visibility of an RFID device. An example of such an RFID device is a tag including a retroreflective optical element such as the tag depicted in FIG. 4. The RFID device 400 depicted in FIG. 4 includes a backing layer 420, and an embossed optical element 410. The embossed optical element 410 includes retroreflective indicia 430 which spells out 'STOP.' As can be appreciated, the retroreflective indicia 430 is highly visible and can be useful to draw attention to the RFID tag 400. In various embodiments, any type of sign may be used, such as cautionary warnings on appliances, street signs indicating speed limits, road hazards, or other issues, freeway signs indicating the services available at another stop, or freeway signs indicating the number of miles to a particular destination or exit. Other signs that may be provided may include exit signs in a store, in store signs indicating departments, sections, or objects on sale.

In each case, the RFID device 400 may provide additional information to a system capable of communicating with the RFID device 400. For example, for road signs, the RFID device 400 may contain location and/or GPS information useable for confirming a location of the sign and the relative position of a user. The RFID device 400 may further be configured to contain information such as a link to current road conditions in the area. For speed limit signs, the RFID device 400 may contain speed limit information that may be useable by autonomous navigation systems or cruise control systems to relay information or adjust a vehicle's speed. For in store signs, the RFID device 400 may provide location information that is useful for guiding a user within the store where GPS is unavailable, or for helping to guide a user to a location where a desired product should be stocked on a shelf.

In certain embodiments, the retroreflective indicia can be machine-readable indicia, such as a 1-D, 2-D, or 3-D barcode. For example, it can be useful for retail sales tags to include a retroreflective barcode to facilitate scanning of the tag with an infrared light source and an infrared-sensitive camera. As can be appreciated, such a tag enables redundancy with both radio-frequency and infrared scanning, which may provide greater reliability in case of failure of one of the systems.

In a further embodiment, an RFID tag is disclosed that includes an embossed foil substrate and an embossed optical element that includes retroreflective indicia. As can be appreciated, an RFID tag including such features may provide for at least three distinct mechanisms to identify the RFID tag: RFID, optical, and millimeter wave.

Figure 5:
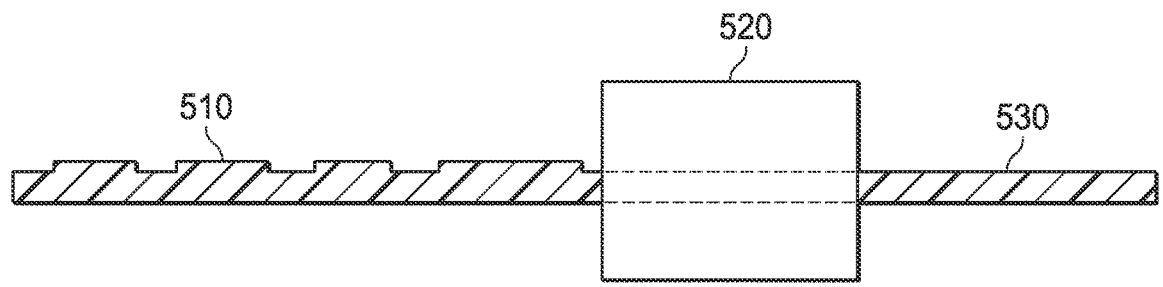
FIG. 5 depicts a schematic view showing a method to modify the embossed optical elements of an RFID tag, in accordance with some embodiments.

As can be appreciated, embossed optical elements formed of a suitable plastic can be further modified after embossing. For example, application of thermal energy can melt thermoplastic materials, such as PET, to selectively remove embossing. Generally, such thermal energy can be applied in any suitable fashion such as by use of a thermal or mechanical printer or the like. An exemplary process of using a thermal or mechanical printer to modify the optical properties of an RFID tag containing an embossed optical element is depicted in FIG. 5.

In some embodiments, one or more RFID devices 510 (e.g., a single RFID device, a roll of RFID devices) including embossed optical and/or radiofrequency elements may be fed through a printer 520 (e.g., from left to right in FIG. 5) to produce one or more RFID devices 530 that include optically and/or radiofrequency wave modified embossed elements. In some embodiments, the optically and/or radiofrequency wave modified embossed elements may be modified to lack any embossed features, meaning that the one or more RFID devices 530 lack any such optical and/or radiofrequency wave features. In some embodiments, the optically and/or radiofrequency wave modified embossed elements may be modified to have greater or reduced features in size and/or effectiveness. In some embodiments, one or more RFID devices 530 (e.g., a single RFID device, a roll of RFID devices) lacking embossed optical and/or radiofrequency elements may be fed through a printer 520 (e.g., from right to left in FIG. 5) to produce one or more RFID devices 510 that include optically and/or radiofrequency wave modified embossed elements.

In some embodiments, the printer 520 can be a thermal printer which selectively heats portions of the embossed optical element. In other embodiments, the printer 520 can be a ribbon printer that applies an optically modifying ribbon, such as a ribbon which changes the index of refraction. For example, the printer 520 can alternatively print or otherwise deposit additional material onto the embossed optical element to modify the optical properties or to prevent light transmission. In addition to heat, embossed optical or radiofrequency elements can also be modified using strain and pressure. For example, in some embodiments, the printer 520 includes one or more patterned rollers or dies that can be used to modify the embossed optical element. Such patterned rollers and/or dies may include a gap to prevent damage to the RFID chip or may deliberately damage the chip to permanently disable the RFID tag.

Figure 6A:
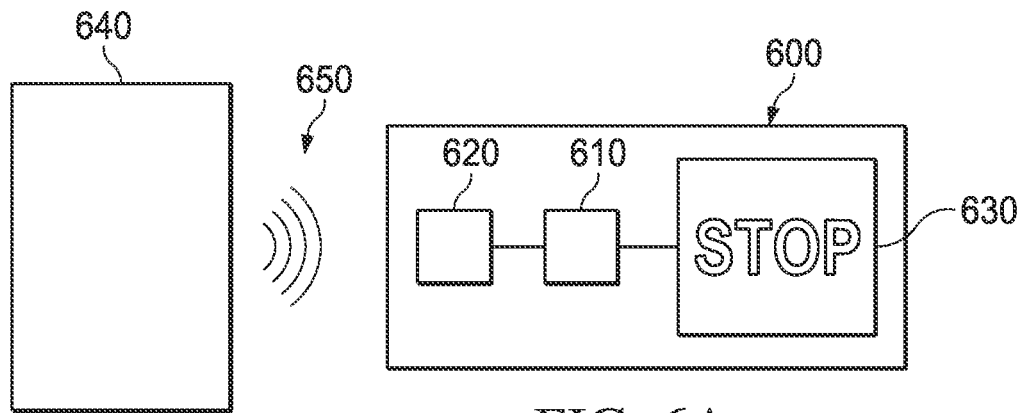
FIGS. 6A and 6B depict an overhead view of an RFID system including an RFID reader and an RFID tag. The RFID tag includes an embossed optical element modifiable by the RFID tag.
Figure 6B:
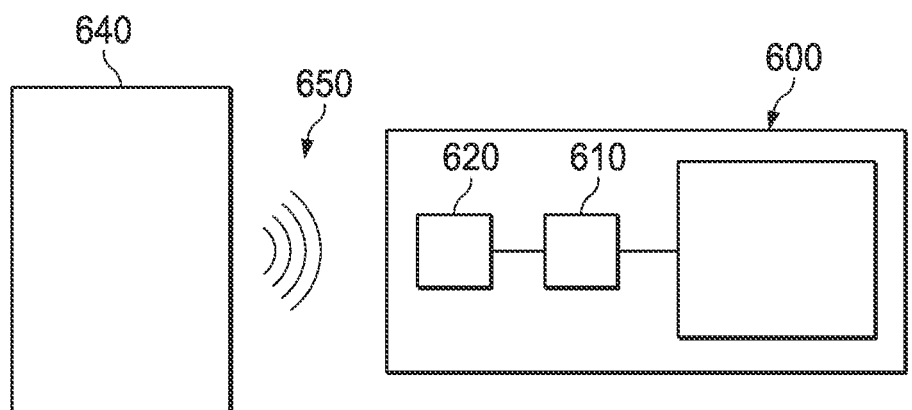

Additionally or alternatively, in some embodiments, modification of the embossed optical elements can be completed by an RFID device itself. For example, an RFID tag can include one or more modifying elements such as heating elements (e.g., nichrome wire) to modify the properties of an embossed optical element by generating heat. An example of such a system is depicted in FIGS. 6A and 6B which depicts an RFID device 600 and RFID reader 640. The RFID device includes an RFID chip 610, an RFID antenna 620, and an embossed optical element 630 having indicia. In response to a signal 650 transmitted by the RFID reader 640, the RFID chip 610 heats selected areas of the embossed optical element 630 that include the heating element to modify the embossed optical element 630. In certain embodiments, the embossed optical element 630 can "erase" the indicia of the embossed optical element 630 as depicted in FIG. 6B.

In some embodiments, the use of a modifying element may be used to reveal visual elements by melting, evaporating, or otherwise destroying material that previously concealed the embossed optical element 630, thus appearing to "write" or create content for the embossed optical element 630. In appearance, the beginning RFID device 600 of FIG. 6B may receive a signal that causes the RFID device 600 to heat the heating element that modifies, removes, destroys, or otherwise alters the RFID device 600 to reveal the visible indicia of the embossed optical element 630, such as in FIG. 6A.

Alternatively or in addition, the modifying element can include a piezoelectric substrate, such as a substrate formed of polyvinylidene difluoride ("PVDF"), which can apply strain or pressure to the embossed optical element. As can be appreciated, a piezoelectric substrate can, in certain embodiments, produce reversible strain and can allow for either temporary or permanent changes to the embossed optical element. In some embodiments, at least part of the fourth layer 140 may be composed of a piezoelectric substrate, and other remaining parts of the fourth layer 140 may be composed of one or more of plastic, metal, wood, paper, cardboard, semiconductor material, or glass.

As can be appreciated, selective modification of an embossed optical element can provide enhanced functionality. For example, a sales item can be modified to indicate than an item has been purchased while a ticket can be modified to indicate that it has been redeemed. As another example, an access control pass can include a series of numbers to indicate the number of remaining uses. As those remaining uses are redeemed (e.g., on reentries, trips, redemptions, etc.), the remaining numbers can be erased.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

It should be understood that certain aspects, features, structures, or characteristics of the various embodiments can be interchanged in whole or in part. Reference to certain embodiments mean that a particular aspect, feature, structure, or characteristic described in connection with certain embodiments can be included in at least one embodiment and may be interchanged with certain other embodiments. The appearances of the phrase "in certain embodiments" in various places in specification are not necessarily all referring to the same embodiment, nor are certain embodiments necessarily mutually exclusive of other certain embodiments. It should also be understood that the steps of the methods set forth herein are not necessarily required to be performed in the orders described, and the order of the steps of such methods should be understood to be merely exemplary. Likewise, additional steps can be included in such methods, and certain steps may be omitted or combined, in methods consistent with certain embodiments.

The terms "one or more of a, b, and c", "at least one of a, b, and c", and "at least one of a, b, or c" are intended to refer to a, b, c, or combinations thereof including 1) one or multiple of a and one or multiple of b, 2) one or multiple of b and one or multiple of c, 3) one or multiple of a and one or multiple of c, 4) one or multiple of a, 5) one or multiple of b, or 6) one or multiple of c.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An RFID device comprising:
    an RFID assembly comprising a foil RFID antenna and an RFID chip electrically coupled to the foil RFID antenna, the RFID assembly having a first side and a second side; and
    a first layer comprising a first visual element and having a first side and a second side, the first side of the first layer contacting the first side of the RFID assembly, wherein the first layer comprises a plastic;
    a second layer supporting the RFID assembly having a first side and a second side, the first side of the second layer contacting at least one of the first visual element and the RFID assembly; and
    a modifying element electrically coupled to the RFID chip and configured to modify the RFID device to display a visible indicia of the first visual element, wherein the modifying element comprises a piezoelectric element.

2. The RFID device of claim 1, wherein the plastic comprises one or more of polyethylene terephthalate ("PET"), polyethylene, polypropylene, polycarbonate, polystyrene, and acrylonitrile butadiene styrene ("ABS").

3. The RFID device of claim 1, wherein the second layer comprises a second visual element, and the first side of the second layer contacts the second side of the RFID assembly.

4. The RFID device of claim 1, wherein the second layer comprises a fibrous substrate.

5. The RFID device of claim 4, wherein the fibrous substrate comprises paper.

6. The RFID device of claim 1, wherein the first visual element comprises one or more of patterns, symbols, text, and machine-readable indicia.

7. The RFID device of claim 1, wherein the first visual element comprises one or more of diffraction patterns, holograms, and retroreflective elements.

8. The RFID device of claim 1, wherein the first visual element comprises machine-readable indicia that are retroreflective to infrared light.

9. The RFID device of claim 1, wherein the foil RFID antenna is formed from a foil layer.

10. The RFID device of claim 9, wherein the foil layer is embossed.

11. The RFID device of claim 9, wherein the foil layer is retroreflective.

12. The RFID device of claim 9, wherein the foil layer is retroreflective to millimeter wave radio frequencies.

13. The RFID device of claim 1, wherein the first visual element is an embossed optical element.

14. The RFID device of claim 13, wherein the embossed optical element is configured to be modified by the modifying element based on application of strain or pressure.

15. The RFID device of claim 13, wherein the modification of the embossed optical element is reversible.

16. A method of manufacturing an RFID device comprising:
    providing an RFID assembly, the RFID assembly comprising a foil RFID antenna and an RFID chip electrically coupled to the foil RFID antenna;
    affixing an optical element over at least a portion of the RFID assembly, wherein the optical element comprises a plastic;
    embossing at least a portion of the optical element; and
    modifying the RFID device to display a visible indicia of the optical element using a modifying element, electrically coupled to the RFID chip, wherein the modifying element comprises a piezoelectric element.

17. The method of claim 16, wherein at least one of providing the RFID assembly, affixing the optical element, and embossing is performed using a roll-to-roll process.

* * * * *